(12) United States Patent
Wang

(10) Patent No.: US 11,740,817 B2
(45) Date of Patent: Aug. 29, 2023

(54) MODULAR DATA PROCESSING AND STORAGE SYSTEM

(71) Applicant: Visa International Service Association, San Francisco, CA (US)

(72) Inventor: Quan Wang, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/957,947

(22) Filed: Sep. 30, 2022

(65) Prior Publication Data

US 2023/0043361 A1 Feb. 9, 2023

Related U.S. Application Data

(63) Continuation of application No. 17/344,220, filed on Jun. 10, 2021, now Pat. No. 11,513,706, which is a continuation of application No. 16/633,785, filed as application No. PCT/US2017/044595 on Jul. 31, 2017, now Pat. No. 11,061,592.

(51) Int. Cl.
*G06F 3/06* (2006.01)
*G06Q 20/06* (2012.01)
*G06Q 20/38* (2012.01)

(52) U.S. Cl.
CPC ............ *G06F 3/0635* (2013.01); *G06F 3/067* (2013.01); *G06F 3/0622* (2013.01); *G06F 3/0631* (2013.01); *G06Q 20/0658* (2013.01); *G06Q 20/382* (2013.01)

(58) Field of Classification Search
None
See application file for complete search history.

(56) References Cited

U.S. PATENT DOCUMENTS

| 7,124,180 B1 | 10/2006 | Ranous |
| 11,061,592 B2 | 7/2021 | Wang |
| 2003/0172149 A1 | 9/2003 | Edsall et al. |

(Continued)

FOREIGN PATENT DOCUMENTS

EP 1039694 B1 12/2005

OTHER PUBLICATIONS

U.S. Appl. No. 16/633,785 , "First Action Interview Pilot Program Pre-Interview Communication", dated Nov. 30, 2020, 4 pages.

(Continued)

*Primary Examiner* — Edward J Dudek, Jr.
*Assistant Examiner* — Ralph A Verderamo, III
(74) *Attorney, Agent, or Firm* — Kilpatrick Townsend & Stockton LLP

(57) ABSTRACT

A system enables entities to access a single platform in order to utilize electronic data storage for storing different types of information. One or more computers may operate an electronic data storage processing network that entities can access when updating information in electronic data storage. The electronic data storage processing network may operate a plurality of electronic data storage processing modules, which can include an aggregator module, a formatter module, an operator signer module, and a validator module. Based on the specific use case for which electronic data storage is utilized, recordable data that is to be added to the electronic data storage can be processed by the appropriate aggregating, formatting, signing, and validating functions provided by the electronic data storage processing modules.

20 Claims, 7 Drawing Sheets

(56) References Cited

U.S. PATENT DOCUMENTS

| | | |
|---|---|---|
| 2003/0187948 A1 | 10/2003 | Bellon |
| 2004/0255028 A1 | 12/2004 | Chu et al. |
| 2011/0060809 A1 | 3/2011 | Cohen et al. |
| 2012/0016942 A1 | 1/2012 | Cherian et al. |
| 2014/0044126 A1 | 2/2014 | Sabhanatarajan et al. |
| 2015/0066875 A1 | 3/2015 | Peake |
| 2015/0254649 A1 | 9/2015 | Radu |
| 2016/0127492 A1 | 5/2016 | Malwankar et al. |
| 2017/0026263 A1 | 1/2017 | Gell et al. |
| 2017/0139950 A1 | 5/2017 | Mortensen et al. |

OTHER PUBLICATIONS

U.S. Appl. No. 16/633,785 , "Notice of Allowance", dated Mar. 10, 2021, 9 pages.
U.S. Appl. No. 17/344,220 , "Notice of Allowance", dated Jul. 1, 2022, 9 pages.
PCT/US2017/044595 , "International Preliminary Report on Patentability", dated Feb. 13, 2020, 7 pages.
PCT/US2017/044595 , "International Search Report and Written Opinion", dated Dec. 29, 2017, 10 pages.

MODULAR DATA PROCESSING AND STORAGE SYSTEM

CROSS-REFERENCES TO RELATED APPLICATIONS

This application is a Continuation Application of U.S. application Ser. No. 17/344,220 filed Jun. 10, 2021, which is a Continuation Application of U.S. application Ser. No. 16/633,785, filed Jan. 24, 2020, which is a National Stage of International Application No. PCT/US2017/044595, International Filing Date Jul. 31, 2017, of which are herein incorporated by reference.

BACKGROUND

Along with the rise of the digital world, the amount of online content is continually increasing. To handle this increase, various mechanisms for storing digital content have been developed. Entities can utilize electronic data storage to store and manage information related to various activities. While one benefit of the utilization of electronic data storage is that it can be utilized by various entities for a range of different purposes corresponding to different types of information, this has resulted in a multitude of implementations. However, some of these implementations have unique characteristics that are not compatible with certain systems. For example, if a plurality of different entities decide to implement a plurality of different types of electronic data storages, each of the plurality of different types of electronic data storages may need to be created and managed using different platforms or data. Thus, conventional systems may not be able to easily expand usage of electronic data storage outside of specific use cases (e.g., cryptocurrency transactions), which is limiting.

Embodiments of the invention address this and other problems, individually and collectively.

BRIEF SUMMARY

One embodiment of the invention is related to a method that can be performed by a server computer. The method may comprise receiving a data packet comprising a) recordable data and b) address data for a plurality of electronic data storage processing modules run on one or more computers, the address data comprising a first address for a first electronic data storage processing module and a second address for a second electronic data storage processing module. The method may further comprise routing the recordable data and at least some of the address data to the first electronic data storage processing module using the first address and processing the recordable data by the first electronic data storage processing module. The method may further comprise routing the recordable data processed by the first electronic data storage processing module to the second electronic data storage processing module using the second address and processing the recordable data by the second electronic data storage processing module. The method may further comprise recording the recordable data to an electronic data storage of a plurality of different electronic data storages after processing the recordable data by the second electronic data storage processing module. In some embodiments, the first electronic data storage processing module comprises an aggregator module and the second electronic data storage processing module comprises a formatter module.

In some cases, processing the recordable data by the first electronic data storage processing module may comprise determining a function from the aggregator module based on the first address and processing the recordable data using the function. The function may be configured to aggregate the recordable data.

In some cases, processing the recordable data by the second electronic data storage processing module may comprise determining a function from the formatter module based on the second address processing the recordable data using the function. The function may be configured to format the recordable data into a format compatible with the electronic data storage.

In some embodiments, the method may comprise further steps wherein the data packet may be a first data packet, the recordable data may be a first recordable data, and the electronic data storage may be a first electronic data storage. The method may further comprise receiving a second data packet comprising a) second recordable data and b) second address data for the plurality of electronic data storage processing modules run on the one or more computers, the address data comprising the first address for the first electronic data storage processing module and a third address for the second electronic data storage processing module. The method may further comprise routing, the recordable data and at least some of the address data to the first electronic data storage processing module using the first address and processing the recordable data by the first electronic data storage processing module. The method may further comprise routing the recordable data processed by the first electronic data storage processing module to the second electronic data storage processing module using the third address and processing the recordable data by the second electronic data storage processing module. The method may further comprise recording the recordable data to a second electronic data storage of the plurality of different electronic data storages after processing the recordable data by the second electronic data storage processing module.

In some embodiments, the function may be a first function and processing the recordable data by the second electronic data storage processing module may comprise determining a second function from the formatter module based on the third address and processing the recordable data using the second function. The second function may be configured to into a format compatible with the second electronic data storage.

In some implementations, at least some of the plurality of different electronic data storages may be in different formats and can be used for recording different types of recordable data. For example, the different electronic data storage may be respectively adapted to record data for cryptocurrency transactions, non-financial asset ownership transactions, and identity verification transactions.

Another embodiment of invention is directed to a server computer comprising a processor and a computer readable medium coupled to the processor, the computer readable medium comprising code, executable by the processor to implement a method. The method may comprise receiving a data packet comprising a) recordable data and b) address data for a plurality of electronic data storage processing modules run on one or more computers, the address data comprising a first address for a first electronic data storage processing module and a second address for a second electronic data storage processing module. The method may further comprise routing the recordable data and at least some of the address data to the first electronic data storage processing module using the first address and processing the recordable data by the first electronic data storage processing module. The method may further comprise routing the recordable data processed by the first electronic data storage processing module to the second electronic data storage processing module using the second address and processing the recordable data by the second electronic data storage processing module. The method may further comprise recording the recordable data to an electronic data storage of a plurality of different electronic data storages after processing the recordable data by the second electronic data storage processing module.

Another embodiment of invention is directed to a method that can be performed by a user device. The method can comprise determining a data packet comprising a) recordable data and b) address data for a plurality of electronic data storage processing modules run on one or more computers, the address data comprising a first address for a first electronic data storage processing module and a second address for a second electronic data storage processing module. The method can further comprise sending, to a server computer, the data packet with a request to record the recordable data to an electronic data storage of a plurality of different electronic data storages. The method may further comprise receiving a confirmation that the recordable data was recorded to the electronic data storage. In some embodiments, the recordable data may be routed to the first electronic data storage processing module using the first address and processed by the first electronic data storage processing module. Further, the recordable data is routed to the second electronic data storage processing module using the second address and processed by the second electronic data storage processing module.

In some embodiments, the method may comprise further steps wherein the data packet may be a first data packet, the recordable data may be first recordable data, the electronic data storage may be a first electronic data storage, and the request may be a first request. The method may further comprise determining a second data packet comprising a) second recordable data and b) address data for a plurality of electronic data storage processing modules run on one or more computers. The address data may comprise the first address for the first electronic data storage processing module and a third address for the second electronic data storage processing module. The method may further comprise sending, to a server computer, the second data packet with a second request to record the recordable data to a second electronic data storage of the plurality of different electronic data storages. The method may further comprise receiving a confirmation that the recordable data was recorded to the electronic data storage. In some cases, the second recordable data may be routed to the first electronic data storage processing module using the first address and processed by the first electronic data storage processing module, and the second recordable data may be routed to the second electronic data storage processing module using the third address and processed by the second electronic data storage processing module.

Another embodiment of the invention is further directed to a user device comprising a processor and a memory element. The memory element can comprise code, executable by the processor, for implementing a method. The method can comprise determining a data packet comprising a) recordable data and b) address data for a plurality of electronic data storage processing modules run on one or more computers, the address data comprising a first address for a first electronic data storage processing module and a second address for a second electronic data storage processing module. The method can further comprise sending, to a server computer, the data packet with a request to record the recordable data to an electronic data storage of a plurality of different electronic data storages. The method may further comprise receiving a confirmation that the recordable data was recorded to the electronic data storage. In some cases, the recordable data may be routed to the first electronic data storage processing module using the first address and processed by the first electronic data storage processing module and the recordable data may be routed to the second electronic data storage processing module using the second address and processed by the second electronic data storage processing module.

These and other embodiments of the invention are described in further detail below.

DETAILED DESCRIPTION

Figure 1:
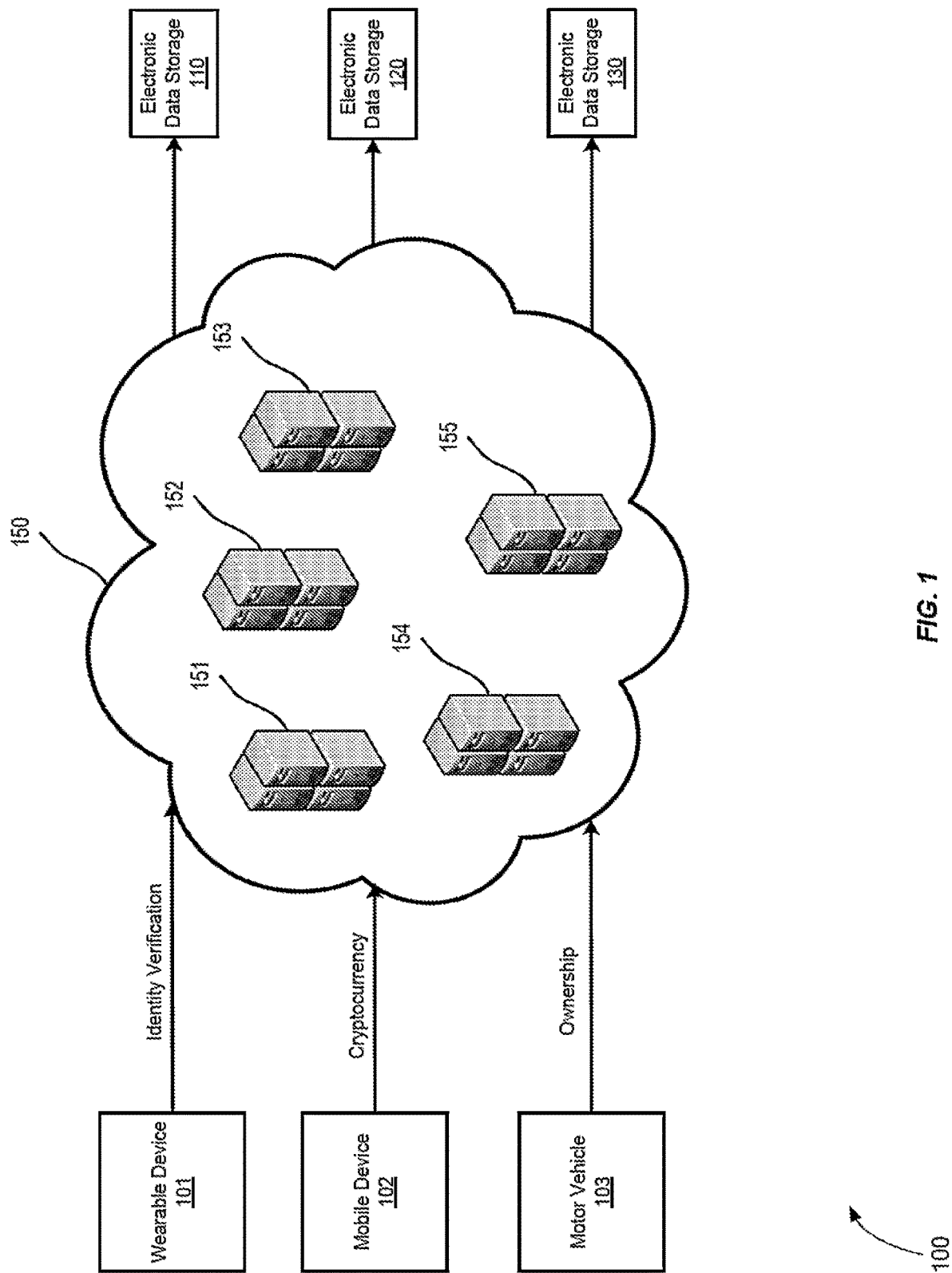
FIG. 1 shows a block diagram showing various elements of an exemplary system according to embodiments of the present invention.

Embodiments of the invention are directed to a system that enables entities to access a single platform in order to utilize electronic data storage for storing different types of information. One or more computers may operate a network that entities can access when updating information in electronic data storage. The network may operate a plurality of electronic data storage processing modules, which can include an aggregator module, a formatter module, an operator signer module, and a validator module. Based on the specific use case for which electronic data storage is utilized, recordable data that is to be added to the electronic data storage can be processed by the appropriate aggregating, formatting, signing, and validating functions provided by the electronic data storage processing modules.

Before discussing specific embodiments and examples, some descriptions of terms used herein are provided below.

"Electronic data storage" may refer to a compilation of data. The electronic data storage may include entries with information related to events, messages, or transactions. The electronic data storage may comprise a database or other comparable data structure that may be configured to store data from all previous entries. In some cases, each entry may include a timestamp of the corresponding event (e.g., transmission of message, conducting a transaction, transfer of ownership, etc.) as well as information related to entities involved (e.g., the sender and the receiver of a message, the requestor and resource provider of a transaction, the entities to and from which ownership is transferred, etc.). In some embodiments, the electronic data storage may be in the form of an electronic ledger (e.g., blockchain) in which data already stored in the electronic data storage is unalterable. In some embodiments, some or all entities within a system may store their own copies of information in one or more electronic data storages.

"Recordable data" may refer to information that can be recorded. In some cases, recordable data may be information that can be stored in electronic data storage. In some embodiments, recordable data may include information related to an event (e.g., transmission of message, conducting a transaction, transfer of ownership, etc.). For example, recordable data may include information indicating a date and time (e.g., timestamp), entities involved in an event (e.g., identifiers corresponding to the sender and the receiver of a message, the requestor and resource provider of a transaction, the entities to and from which ownership is transferred, etc.), and other characteristics of an event (e.g., location information, reason for request, requested resource, transaction amount, transaction data, etc.).

"Transaction data" (which may also be known as transaction information) may refer to any data or information surrounding or related to a transaction. For example, transaction data may include transaction details and any data associated with the transaction that may be utilized by entities involved in the transaction process. For instance, the transaction data may include information useful for processing and/or verifying the transaction. Transaction data may also include any data or information surrounding or related to any participants partaking in or associated with the transaction. Example transaction data may include a transaction amount, transaction location, resources received (e.g., products, documents, etc.), information about the resources received (e.g., size, amount, type, etc.), resource providing entity data (e.g., merchant data, document owner data, etc.), user data, date and time of a transaction, payment method, and other relevant information.

"Address data" may refer to information that indicates a particular location. In some embodiments, the address data may include information that indicates a location within electronic data storage or memory in a computer. For example, the address data may include a unique number that refers to a certain byte of data stored in memory. In some cases, the address data may indicate electronic data storage processing module to which recordable data should be routed.

"Electronic data storage processing modules" may refer to code that can be utilized to process information related to an electronic data storage. In some cases, electronic data storage processing module may include code and other data that can enable various types of processing, such as aggregating, formatting, signing, or validating information related to an electronic data storage. In some embodiments, each electronic data storage processing module may include code corresponding to a plurality of functions that can process information related to an electronic data storage. An exemplary electronic data storage processing module may be a formatter processor module, which may include code corresponding to a plurality of formatting functions that can format information related to an electronic data storage.

A "digital signature" may refer to an electronic signature. In some embodiments, the digital signature may be used to validate the authenticity of information (e.g., message) sent within a system. A digital signature may be a unique value generated based on the information and a private key using an encryption algorithm. In some embodiments, a verification algorithm using a public key may be used to verify the digital signature. The digital signature may be a numeric value, an alphanumeric value, or any other type of data including a graphical representation.

A "key" may refer to a piece of data or information used for an algorithm. A key may be a unique piece of data. In some cases, the key may be an asymmetric key that is typically part of a key pair, where a first key may be utilized to encrypt data and a second key may be utilized to decrypt the encrypted data. In other cases, the key may be a symmetric that can be utilized to encrypt data and also decrypt the encrypted data. The key may be a numeric or alphanumeric value and may be generated using an algorithm.

A "resource providing entity" may be an entity that may make resources available to a user. Resource providing entities may also be known as resource providers. Examples of resource providing entities include merchants, vendors, suppliers, owners, traders, wallet providers, service providers, and the like. In some embodiments, such entities may be a single individual, small groups of individuals, or larger groups of individuals (e.g., companies). Resource providing entities may be associated with one or more physical locations (e.g., supermarkets, malls, stores, etc.) and online platforms (e.g., e-commerce websites, online companies, etc.). In some embodiments, resource providing entities may make available resources that are physical items (e.g., goods, products, etc.) to the user. In other embodiments, resource providing entities may make available digital resources (e.g., electronic documents, electronic files, etc.) or services (e.g., digital wallet services) to the user. In some embodiments, resource providing entities may manage access to certain resources by the user.

An "authorization computer" can include any system enabling an authorization process. The authorization computer may determine whether a transaction can be authorized and may generate an authorization response message including an authorization status (also may be known as an authorization decision). In some embodiments, an authorization computer may be an issuer computer that issues accounts (e.g., payment accounts) and corresponding account information to users. In some cases, the authorization computer may store contact information of one or more users.

A "server computer" can be a powerful computer or a cluster of computers. For example, the server computer can be a large mainframe, a minicomputer cluster, or a group of servers functioning as a unit. In one example, the server computer may be a database server coupled to a Web server.

FIG. 1 illustrates an exemplary system 100 with at least some of the components for implementing embodiments of the invention. System 100 may enable entities to access a network to update information of a plurality of electronic data storage, where at least some of the plurality of electronic data storage may be utilized for recording different type of recordable data. FIG. 1 includes a wearable device 101, a mobile device 102, and a motor vehicle 103 in communication with an electronic data storage processing network 150. Electronic data storage processing network 150 may be operated by server computers 151 to 155 and may process recordable data that can be added to an electronic data storage 110, 120, and 130.

Each of the computing devices (e.g., wearable device 101, mobile device 102, and motor vehicle 103, server computers 151-155) in FIG. 1 may include a network interface and may be capable of communicating (e.g., remotely) with each other or other computing devices over a communications network (e.g., electronic data storage processing network 150). Further, each of the computing devices may include a processor and a computer readable medium comprising code, executable by the processor for performing the functionality described herein. Each of the computing devices in FIG. 1 may also be capable of short-range communication through contact or contactless methods (e.g., NFC, Wi-Fi, Bluetooth, etc.).

While system 100 shows three exemplary user devices accessing electronic data storage processing network 150, embodiments are not so limiting. In other embodiments, there may be more than three user devices or fewer than three computing devices accessing electronic data storage processing network 150. Further, in some embodiments, other types of user devices may be part of system 100 instead of or in addition to wearable device 101, mobile device 102, and motor vehicle 103. Some non-limiting examples of such user devices include cellular phones, keychain devices, personal digital assistants (PDAs), notebooks, laptops, notepads, smart watches, fitness bands, jewelry, automobiles with remote communication capabilities, personal computers, cards (e.g., smart cards, magnetic stripe cards, etc.), and the like.

Each of the user devices in FIG. 1 may be operated by a user. In some cases, the same user may operate more than one of the user devices. In other cases, a different user may operate each of the computing devices. A user may be an individual or an entity represented by a group of individuals (e.g., corporation, etc.). In some cases, a user may be able to input information into wearable device 101, mobile device 102, or motor vehicle 103. In some embodiments, the user may input information into the user device using a user interface provided by a mobile application.

Electronic data storage processing network 150 may comprise a plurality of networks for secure communication of data and information between entities. In some embodiments, electronic data storage processing network 150 may follow a suitable communication protocol to generate one or more secure communication channels. A communication channel may in some instances comprise a "secure communication channel," which may be established in any known manner, including the use of mutual authentication and a session key and establishment of an SSL session. However, any method of creating a secure channel may be used. By establishing a secure channel, sensitive information may be securely transmitted.

Any suitable communications protocol may be used for generating a communications channel. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

In some embodiments, electronic data storage processing network 150 may be operated by server computers 151-155 that enable electronic data storage processing capabilities. In some cases, the electronic data storage processing capabilities may include aggregating, formatting, signing, and validating of recordable data that is to be recorded in electronic data storage. Server computers 151-155 may enable electronic data storage processing capabilities for a plurality of different electronic data storages that are in different formats and that are used for recording different types of recordable data. For example, recordable data from wearable device 101, mobile device 102, and motor vehicle 103 may each relate to different types of transactions and may all processed by electronic data storage processing network 150.

Electronic data storage processing network 150 may process recordable data from wearable device 101, which may be utilized to conduct identity verification transactions. An identity verification transaction may comprise a process in which information associated with the identity of a user associated a device or the device itself is verified. When an identity verification transaction is conducted by wearable device 101, one or more server computers 151-155 may process recordable data related to the identity verification transaction. The one or more server computers 151-155 perform processing that is specific to identity verification transactions. For example, relevant information (e.g., data fields) may be extracted from the recordable data and formatted into a format that is compatible with electronic data storage 110, which can record recordable data related to identity verification transactions.

Electronic data storage processing network 150 may also process recordable data from mobile device 102, which may be utilized to conduct cryptocurrency transactions. A cryptocurrency transaction may comprise a process in which a resource is requested by a requestor in exchange for cryptocurrency. When a cryptocurrency transaction is conducted by mobile device 102, one or more server computers 151-155 may process recordable data related to the cryptocurrency transaction. The one or more server computers 151-155 perform processing that is specific to cryptocurrency transactions. For example, relevant information (e.g., data fields) may be extracted from the recordable data and formatted into a format that is compatible with electronic data storage 120, which can record recordable data related to cryptocurrency transactions Additionally, electronic data storage processing network 150 may process recordable data from motor vehicle 103, which may be utilized to conduct ownership transactions. An ownership transaction may comprise a process in which ownership of an asset, which can be a non-financial asset, is transferred form one owner to another owner. When an ownership transaction is conducted by motor vehicle 103, one or more server computers 151-155 may process recordable data related to the ownership transaction. The one or more server computers 151-155 perform processing that is specific to ownership transactions. For example, relevant information (e.g., data fields) may be extracted from the recordable data and formatted into a format that is compatible with electronic data storage 130, which can record recordable data related to ownership transactions.

Embodiments of the invention are advantageous over conventional systems, which typically include multiple disconnected modules for processing different types of recordable data. In a conventional system, if an entity wants to utilize different electronic data storage to store information related to different types of transactions, the entity typically has to onboard with multiple platforms that provide processing capabilities for the different types of transactions. For example, the entity may have to register with a platform specifically for recording information related to cryptocurrency transactions, as well as with another platform specifically for recording information related to ownership transactions. In contrast, in embodiments of the invention, electronic data storage processing network 150 can provide a single platform that enables processing of a plurality of different types of recordable data that is to be recorded in electronic data storage. This reduces use of computing resources and processing power typically utilized to register and communicate with multiple electronic data storage platforms.

It is understood that FIG. 1 depicts an exemplary system and that the components shown in system 100 are not limiting. For example, in some cases, more or fewer than five server computers may operate electronic data storage processing network 150. Additionally, in some cases, there may be more or fewer than three electronic data storage that can record recordable data processed by electronic data storage processing network 150.

Figure 2:
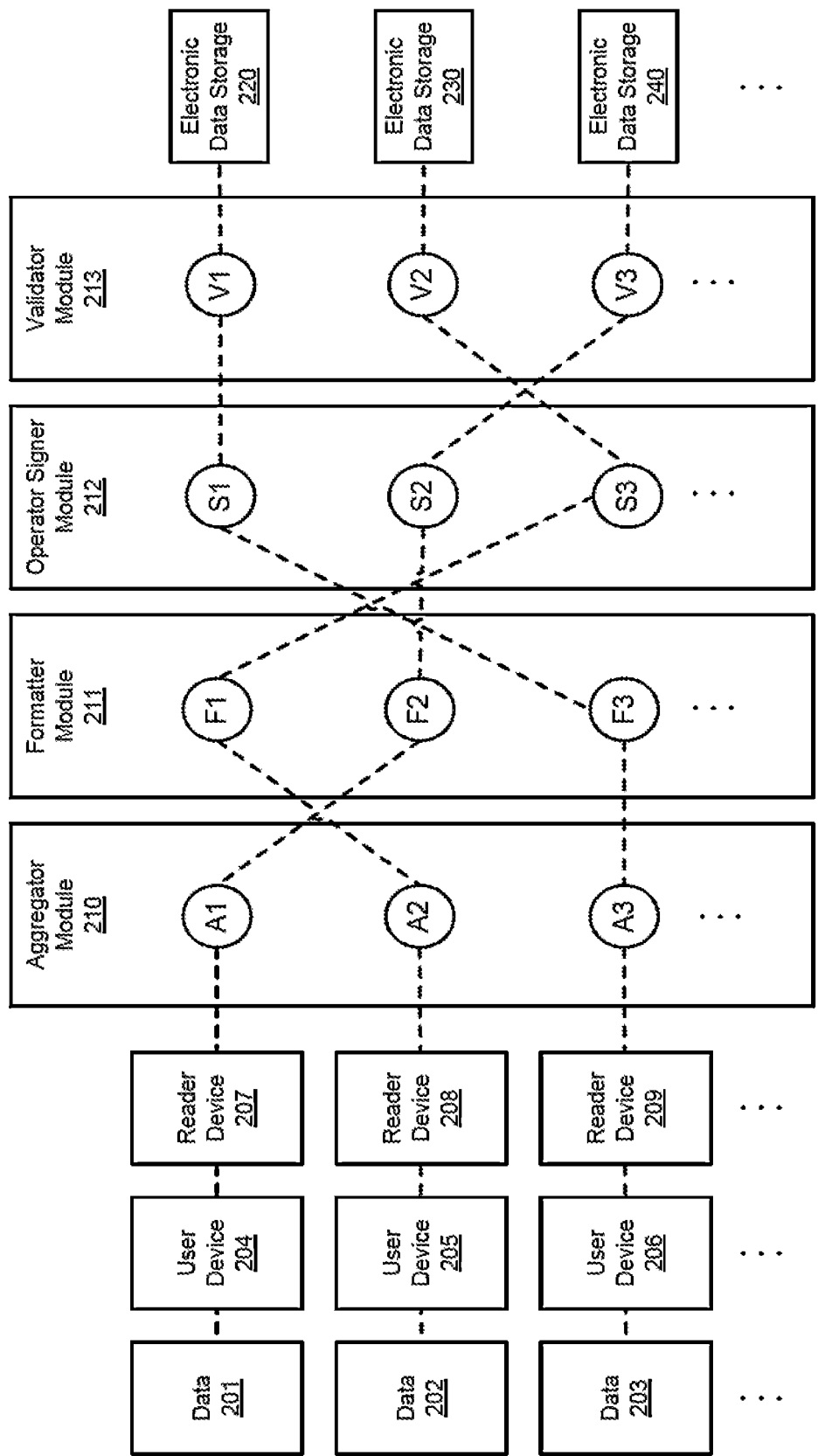
FIG. 2 shows a block diagram showing various elements of an exemplary system according to embodiments of the present invention.

FIG. 2 illustrates an exemplary system 200 with at least some of the components for implementing embodiments of the invention. FIG. 2 depicts data 201-203 related to transactions conducted by user devices 204-208 in communication with reader devices 207-209. FIG. 2 also depicts four electronic data storage processing modules, which include an aggregator module 210, a formatter module 211, an operator signer module 212, and a validator module 213. The electronic data storage processing modules may make up a electronic data storage processing network and in some cases may be operated by one or more server computers (not shown). FIG. 2 also shows electronic data storage 220, 230, 240, which may be utilized to record data that is processed by the electronic data storage processing modules.

User devices 204-206 may be any suitable computing devices operated by a user. User devices 204-206 may be capable of conducting electronic transactions. In some embodiments, user devices 204-206 may include similar characteristics to those described for user devices (e.g., wearable device 101, mobile device 102, or motor vehicle 103) with respect to FIG. 1. In some embodiments, one or more of user devices 204-206 may be operated by the same user.

Reader devices 207-209 may be any suitable computing devices that can communicate information to and from other computing devices. In this exemplary case, reader devices 207-209 may receive information from user devices 204-206, respectively. In some embodiments, reader devices 207-209 may receive information from user devices 204-206 remotely over a communications network. In other embodiments, reader devices 207-209 may receive information from user devices 204-206 over short-range communication through contact or contactless methods (e.g., NFC, Wi-Fi, Bluetooth, etc.). In some cases, reader device 207 may be operated by an entity with which user device 204 is conducting a transaction. Additionally, reader device 208 may be operated by an entity with which user device 205 is conducting a transaction and reader device 209 may be operated by an entity with which user device 206 is conducting a transaction. Some non-limiting examples of such reader devices include tablets, notebooks, laptops, notepads, personal computers, mobile phones, server computers, point-of sale terminal devices, and the like.

Data 201-203 may include information associated with transactions. Each of data 201-203 may comprise recordable data that may include information related to a transaction conducted by user devices 204-206, respectively. For example, the recordable data may include information indicating a date and time (e.g., timestamp) of a transaction, entities involved in a transaction (e.g., identifiers corresponding to the sender and the receiver of a message, the requestor and resource provider of a transaction, the entities to and from which ownership is transferred, etc.), and other characteristics of an transaction (e.g., location information, reason for request, requested resource, transaction amount, transaction data, etc.).

Electronic data storage 220-240 may store recordable data processed by one or more electronic data storage processing modules. In some embodiments, each of electronic data storage 220-240 may store data entries associated with a plurality of transactions. Each of the data entries may include recordable data. In some implementation, electronic data storage 220-240 may be configured so that data that is already stored is unalterable.

For example, electronic data storage 220 may be in the form of a blockchain and recordable data corresponding to a new transaction can be stored in a new entry. The new entry may also comprise a data header that includes information that makes the new entry unalterable without detection. For example, the data header may include a hash of the previous entry in electronic data storage 220, as well as a root value computed based on all past entries in electronic data storage. Since each entry in electronic data storage 220 may be generated in a similar manner by including a data header storing information referencing its previous entries, no data already stored in electronic data storage 220 can be modified without affecting all following entries. This can ensure that any tampering of stored information, such as an attempt to reassign an asset to an inappropriate entity, will not go unnoticed. Electronic data storage 230 and 240 may include similar characteristics to those described for electronic data storage 220.

While electronic data storage 220-240 can include some structural similarities with each other as described above, electronic data storage 220-240 may be utilized for recording information associated with different types of transactions. Different types of transactions can generate various types of recordable data due to differences in the types of originating devices, messaging protocols, message formats, and other factors. As a result, uniform processing cannot be performed on the various types of recordable data before being recorded in electronic data storage. The utilization of electronic data storage processing modules shown in FIG. 2 enable an efficient method for handling a variety of processing for different types of recordable data.

Aggregator module 210 may include software that enables aggregation of recordable data. Aggregator module 210 may receive and combine recordable data from one or more sources. For example, in some cases, aggregator module 210 may aggregate recordable data corresponding to one or more transactions. In an exemplary case, aggregator module 210 may aggregate recordable data corresponding to ten transactions processed by reader device 207, one or more of which may have been conducted by user device 204. In other embodiments, aggregator module 210 may simply aggregate recordable data for a single transaction into a data packet. Aggregator module 210 may also provide aggregated recordable data to formatter module 211.

In some embodiments, aggregator module 210 may include a plurality of aggregating functions, shown as functions A1, A2, and A3 in FIG. 2. Each aggregating function may include code for aggregating recordable data. Each aggregating function may be associated with an address that can be utilized to identify the aggregating function. In some embodiments, some of the aggregating functions may be the same function, in which case they may be associated with the same address.

Formatter module 211 may include software that enables formatting of recordable data. Formatter module 211 may receive recordable data corresponding to one or more transactions from aggregator module 210. Formatter module 211 may enable extraction of relevant information from the recordable data and formatting of the extracted information into a format that is compatible for storage into an electronic data storage. In some cases, formatter module 211 may enable determination of values of certain data fields in a received message based on the format of the message (e.g., HTTP, ISO, XML, etc.). For example, if the received message is an HTTP message, formatter module 211 may be able to determine which data fields, based on an HTTP message standard, include relevant information that is to be recorded in electronic data storage and then extract values from those data fields. Formatter module 211 may then convert the determined values so that they are compatible with the specifications of electronic data storage. For example, formatter module 211 may convert any of the determined values as appropriate to be compatible with these characteristics field length or character type specifications of data fields of the electronic data storage. Formatter module 211 may also provide the recordable data that has been converted to appropriate format to operator signer module 212.

In some embodiments, formatter module 211 may include a plurality of formatting functions, shown as functions F1, F2, and F3 in FIG. 2. Each formatting function may include code for formatting a certain type of recordable data. Each formatting function may be associated with an address that can be utilized to identify the formatting function. In some embodiments, some of the formatting functions may be the same function, in which case they may be associated with the same address.

Operator signer module 212 may include software that enables digital signing of recordable data. Operator signer module 212 may receive recordable data from formatter module 211. In some cases, operator signer module 212 may enable determination of an appropriate operating entity to digitally sign the recordable data and then provide the recordable data to the operating entity, which can digitally sign the recordable data using their private key to produce a digital signature. In some embodiments, the digital signature may be utilized as proof that the recordable data was processed by a trusted entity before being recorded to an electronic data storage. Operator signer module 212 may also provide the recordable data along with the digital signature to validator module 213.

In some embodiments, operator signer module 212 may include a plurality of signing functions, shown as functions S1, S2, and S3 in FIG. 2. Each singing function may include code for digitally signing recordable data. Each signing function may be associated with an address that can be utilized to identify the signing function. In some embodiments, some of the signing functions may be the same function, in which case they may be associated with the same address.

Validator module 213 may include software that enables validation of recordable data. Validator module 213 may receive the recordable data along with the digital signature from operator signer module 212. In some cases, validator module 213 may enable one or more validating entities to validate the recordable data and/or the digital signature. The recordable data can be validated based on a series of verification processes, which may be specific to the type of electronic data storage into which the recordable data is to be recorded. In some cases, the verification processes can include one or more of verifying that the format of the recordable data is valid, verifying a timestamp associated with the recordable data is valid (e.g., not expired), verifying the digital signature provided by operator signer module 212 using the corresponding public key of the operating entity, as well as verifying any other digital signatures that may be include in the recordable data. In some cases, if the one or more validating entities determine that the recordable data is valid, the one or more validating entities may digitally sign the recordable data with their corresponding public key. Validator module 213 may record the recordable data along with the digital signatures in electronic data storage.

In some embodiments, validator module 213 may include a plurality of validating functions, shown as functions V1, V2, and V3 in FIG. 2. Each validating function may include code or data for validating recordable data. Each validating function may be associated with an address that can be utilized to identify the validating function. In some embodiments, some of the validating functions may be the same function, in which case they may be associated with the same address.

Figure 4:
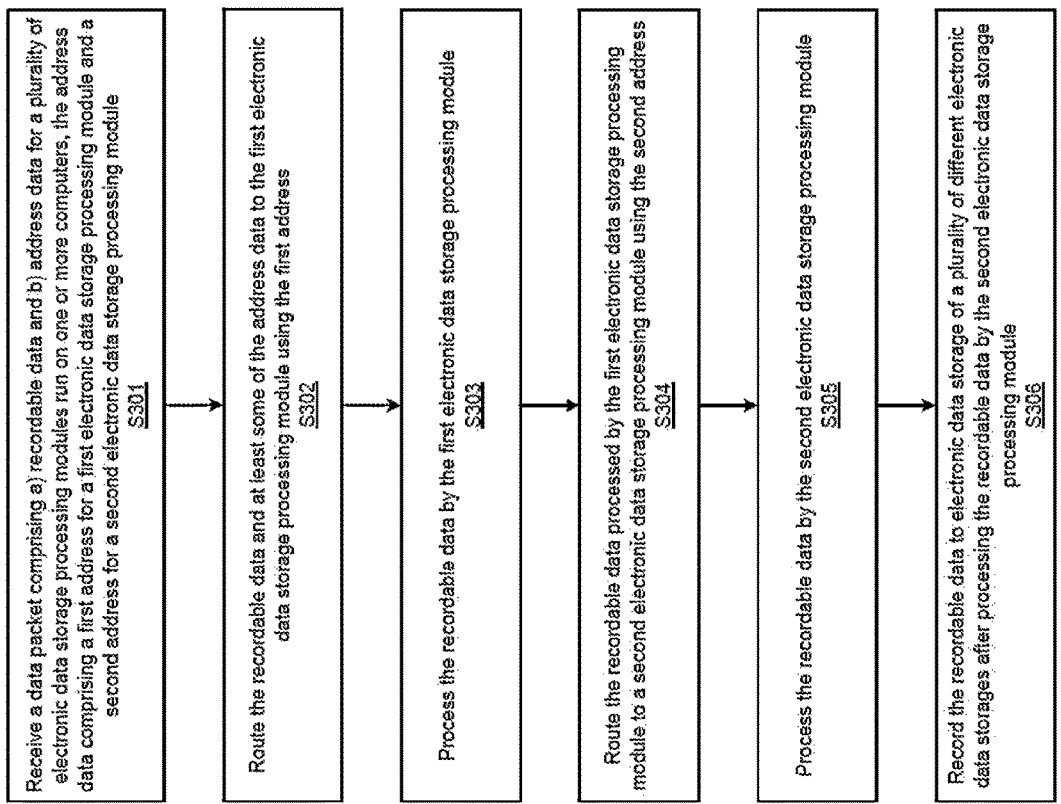
FIG. 4 shows a flow diagram of an exemplary process conducted by a server computer according to embodiments of the present invention.
Figure 5:
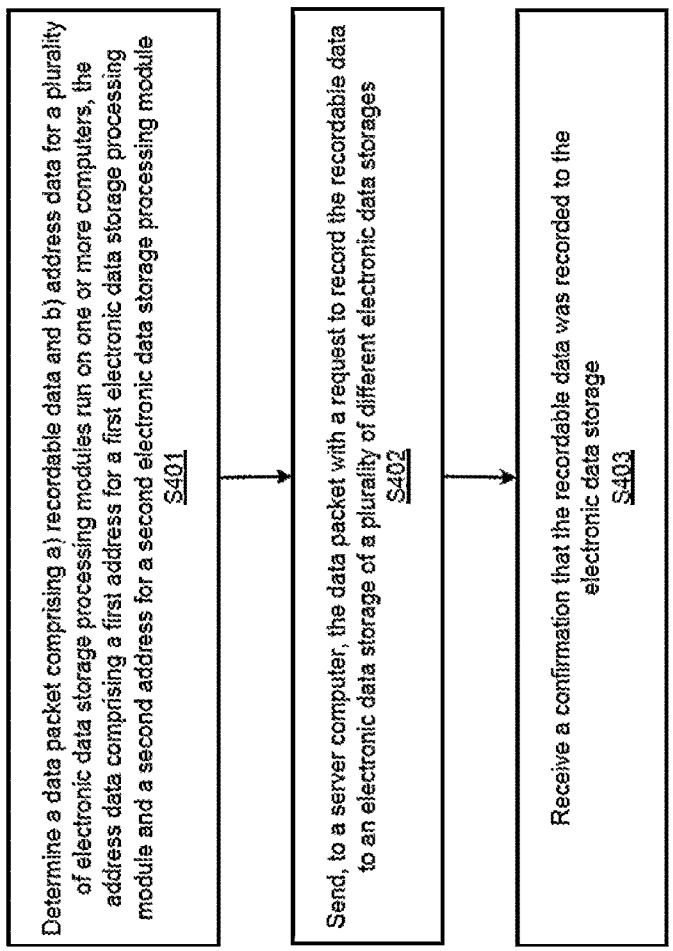
FIG. 5 shows a flow diagram of an exemplary process conducted by a user device according to embodiments of the present invention.

An exemplary process is described below with respect to some components shown in system 200. Some steps are described with respect to FIG. 4, which depicts a flow 300 according to embodiments of the invention. Flow 300 may be performed by a server computer, which may operate electronic data storage processing modules 210-213. Additionally, some steps are described with respect to FIG. 5, which depicts a flow 400 according to embodiments of the invention.

In an exemplary case, user device 204 may communicate (e.g., remotely or over short-range wireless connection) with reader device 207 to conduct an ownership transaction, in which ownership of an asset is transferred from one owner to another owner. The asset may be any suitable property that can be owned, such as a car, a house, or jewelry. Reader device 207 may be associated with an entity with which user device 204 conducts the transaction, such as an ownership transfer service provider.

Upon communication between user device 204 and reader device 207, data 201 may be generated. Data 201 may include any recordable data that can indicate the transfer in ownership of the asset, such as information indicating a date and time (e.g., timestamp) of the ownership transfer, entities involved in the ownership transfer (e.g., identifiers corresponding to the original owner and the new owner, etc.), and other characteristics of the ownership transfer (e.g., details about the asset, location information, reason for ownership transfer, etc.). Data 201 may be generated by one or more of user device 204 and the ownership transfer service provider.

In some cases, user device 204 may determine a data packet including data 201, as well as address data for a plurality of electronic data storage processing modules run on one or more computers (step S401). The address data may comprise a plurality of addresses corresponding to a plurality of electronic data storage processing modules. For example, the address data may comprise a first address for a first electronic data storage processing module and a second address for a second electronic data storage processing module.

In some embodiments, the address data may indicate an order associated with the plurality of addresses. For example, in some cases, the sequence in which the plurality of addresses are included in the address data may correspond to the order of electronic data storage processing modules to which the recordable data is to be routed. In other cases, the address data may include sequence identifiers that indicate the order in which the plurality of addresses is to be utilized for routing the recordable data to an electronic data storage processing modules.

User device 204 may send the data packet to reader device 207 along with a request to record the recordable data to an electronic data storage of a plurality of different electronic data storages (step S402). In this exemplary case, the electronic data storage to which user device 204 requests that the recordable data be recorded may be electronic data storage 240, which may specifically be for recording ownership transactions. Thus, electronic data storage 240 may store different types of recordable data compared to at least some of the plurality of different electronic data storages (e.g., electronic data storage 220, electronic data storage 230, etc.).

Reader device 207 may then provide the data packet comprising data 201 and the address data to a server computer operating an electronic data storage processing network. The electronic data storage processing network may enable a plurality of electronic data storage processing modules including aggregator module 210, formatter module 211, operator signer module 212, and validator module 213. Upon receiving the data packet (step S301), the server computer may process the address data.

The server computer may determine the first address included in the address data. In some cases, the server computer may determine the first address by extracting a predetermined number of bits from the address data. In some implementations, the server computer may extract the leftmost bits of the address data to determine the first address. In other cases, the server computer may determine the first address based on sequence identifiers in the address data that indicate the order of the plurality of addresses. For example, the server computer may determine that the address associated with a sequence identifier of "1" is the first address.

The server computer may route the recordable data and at least some of the address data to the first electronic data storage processing module using the first address (step S602). In some embodiments, the first address may indicate a location in memory that stores information within the first electronic data storage processing module for processing the recordable data. In this exemplary case, the first electronic data storage processing module may comprise an aggregator module 210 and the first address may correspond to an aggregating function A1 for aggregating recordable data. Accordingly, the server computer may route the recordable data and at least some of the address data to aggregating function A1 of aggregator module 210.

The server computer may then process the recordable data by the first electronic data storage processing module (step S303). For example, processing the recordable data by the first electronic data storage processing module may comprise calling aggregating function A1 with the recordable data as an input. Aggregating function A1 may enable combining the received recordable data with other recordable data corresponding to other transactions. For example, aggregating function A1 may enable combining of the received recordable data with other recordable data corresponding to other ownership transactions.

In some cases, aggregating function A1 may send a request to an aggregator device to perform the aggregation. Upon performing the aggregation, the aggregator device can then return the aggregated result back to the server computer. In some embodiments, the aggregator device may be the server computer while in other embodiments, the aggregator device may be a separate computing device.

After the first electronic data storage processing module processes the recordable data, the server computer may then determine the second address included in the address data. In some cases, the server computer may determine the second address by extracting a predetermined number of bits from the address data. In some implementations, the server computer may extract leftmost bits of the address data following the first address to determine the second address. In other cases, the server computer may determine the second address based on sequence identifiers in the address data that indicate the order of the plurality of addresses. For example, the server computer may determine that the address associated with a sequence identifier of "2" is the second address.

The server computer may route the recordable data processed by the first electronic data storage processing module to a second electronic data storage processing module using the second address (step S304). In some embodiments, the second address may indicate a location in memory that stores information within the second electronic data storage processing module for processing the recordable data. In this exemplary case, the second electronic data storage processing module may comprise a formatter module 211 and the second address may correspond to an formatting function F2 for formatting the recordable data. Accordingly, the server computer may route the recordable data to formatting function F2 of formatter module 211.

The server computer may then process the recordable data by the second electronic data storage processing module (step S305). For example, processing the recordable data by the second electronic data storage processing module may comprise calling formatting function F2 of formatter module 211 with the recordable data as an input. Formatting function F2 may enable the received recordable data to be formatted to be compatible with electronic data storage 240 to which user device 204 requested that the recordable data be recorded.

In this exemplary case, the recordable data may include a payload of an HTTP message and thus formatting function F2 may enable a conversion of the recordable data from a HTTP format to a format compatible with the electronic data storage indicated by user device 204. Formatting function F2 may enable determination of which data fields, based on an HTTP message standard, include relevant information that is to be recorded in electronic data storage 240. For example, formatting function F2 may determine the data fields in the recordable data corresponding to information indicating a date and time (e.g., timestamp) of the ownership transfer, entities involved in the ownership transfer (e.g., identifiers corresponding to the original owner and the new owner, etc.), and other characteristics of the ownership transfer (e.g., details about the asset, location information, reason for ownership transfer, etc.). Formatting function F2 may then enable extraction of these data field values from the recordable data. Formatting function F2 may include the determined values into a data entry in a way that is compatible with the specifications of electronic data storage 240. For example, formatting function F2 may convert any of the determined values as appropriate to be compatible with field length or character type specifications for data entries of electronic data storage 240.

In some cases, formatting function F2 may send a request to a formatter device to perform the formatting. Upon performing the formatting, the formatter device can then return the formatted result back to the server computer. In some embodiments, the formatter device may be the server computer while in other embodiments, the formatter device may be a separate computing device.

In some embodiments, the recordable data may be further routed and processed by other electronic data storage processing modules before being recorded to an electronic data storage 240. For example, the recordable data formatted by formatter module 211 may be routed to and processed by function S2 of operator signer module 212, which may enable the recordable data to be digitally signed to produce a digital signature. In addition, the recordable data along with the digital signature may be routed to an processed by function V3 of validator module 213, which may enable the recordable data to be validated before being recorded to an electronic data storage 240.

The recordable data may be routed to operator signer module 212 and validator module 213 based on addresses in the recordable data. For example, the server computer may route the recordable data to operator signer module 212 using a third address. The server computer may determine the third address from the address data, where the third address may correspond to function S2 of operator signer module 212. Additionally, the server computer may route the recordable data to validator module 213 using a fourth address. The server computer may determine the fourth address from the address data, where the fourth address may correspond to function V3 of validator module 213.

After the recordable data has been processed by the second electronic data storage processing module and in some cases as well as by other electronic data storage processing modules, the server computer may record the recordable data to an electronic data storage 240 (step S306). In some embodiments, the recordable data may be recorded to an electronic data storage 240 by including the recordable data formatted by formatter module 211 into a new data entry of electronic data storage 240. In some embodiments, the data entry may be stored in electronic data storage 240 in association with electronic data storage account of the user operating user device 204. In this case, the data entry may be stored in associated with the public address (e.g., hashed public key) associated with the user of user device 204 to indicate that the user conducted the ownership transaction.

In some embodiments, the data entry may include additional data. For example, the data entry may also include one or more digital signatures that may be generated by one or more of user device 204, operator signer module 212, or validator module 213, where the digital signatures can indicate that that recordable data was processed by authenticated entities. In some cases, the data entry may also comprise a data header that includes information that makes the new entry unalterable without detection. For example, the data header may include a hash of the previous entry in electronic data storage 240, as well as a root value computed based on all past entries in electronic data storage 240. Since each entry of electronic data storage 240 may be generated in a similar manner by including a data header storing information referencing its previous entries, no data already stored in electronic data storage 240 can be modified without affecting all following entries. This can ensure that any tampering of stored information, such as an attempt to reassign an asset to an inappropriate entity, will not go unnoticed.

In some embodiments, the server computer may send user device 204 a confirmation that the recordable data was successfully recorded to an electronic data storage 240. User device 204 may receive the confirmation that the recordable data was recorded to an electronic data storage 240 (step S403), which can indicate the completion of the transaction. In this exemplary case, the completion of the ownership transaction may result in proof stored in electronic data storage 240 that the ownership of the asset being successfully transferred from the original owner to the new owner.

While utilization of an exemplary combination of electronic data storage processing functions including aggregating function A1, formatting function F2, signing function S2, and validating function V3 is described above, it is understood that any other suitable combinations of electronic data storage processing functions may be utilized. For example, FIG. 2 also shows an exemplary combination of electronic data storage processing functions including aggregating function A2, formatting function F1, signing function S3, and validating function V2. FIG. 2 further shows another exemplary combination of electronic data storage processing functions including aggregating function A3, formatting function F3, signing function S1, and validating function V1.

Figure 3:
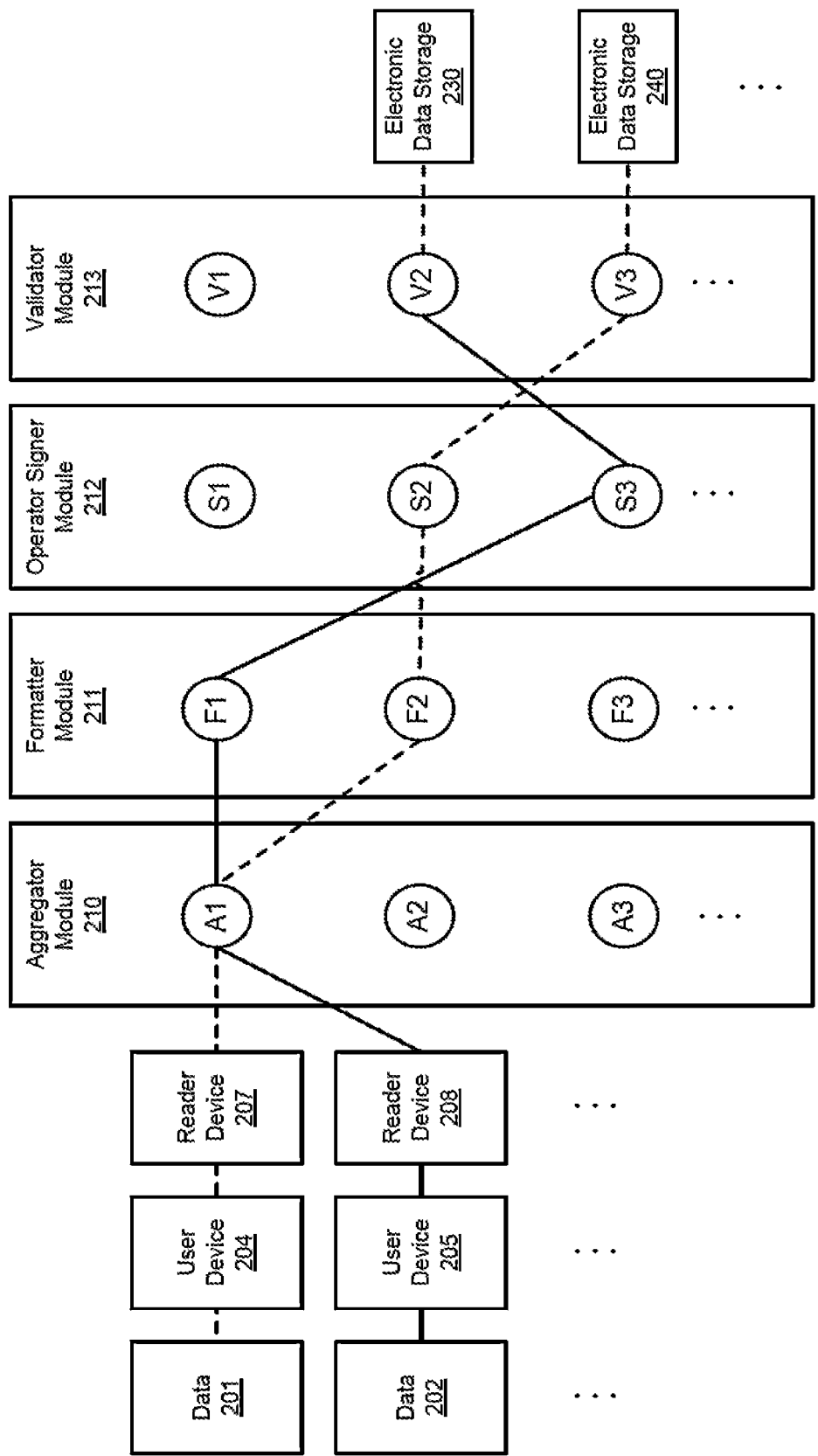
FIG. 3 shows a block diagram showing various elements of an exemplary system according to embodiments of the present invention.

FIG. 3 shows use of further exemplary combinations of electronic data storage processing functions. As shown in FIG. 3, some functions may not be utilized. Additionally, in some cases, recordable data for different transactions can be processed using some of the same electronic data storage processing functions. While FIG. 3 includes only some of the components shown in and described with respect to FIG. 2, it is understood that FIG. 3 can include additional components that are not explicitly shown.

FIG. 3 shows two exemplary transactions being processed. A first transaction may be conducted and processed in a manner similar to that described with respect to FIG. 2. For example, data 201 may correspond to a first transaction that may be conducted between user device 204 and reader device 207. First recordable data of data 201 may be processed using aggregating function A1, formatting function F2, signing function S2, and validating function V3, as well as stored in electronic data storage 240. In addition, data 202 may correspond to a second transaction that may be conducted between user device 205 and reader device 208. Second recordable data of data 202 may be processed using a different combination of electronic data storage processing functions as described in further detail below. The combination of electronic data storage processing functions for the first recordable data corresponding to the first transaction is depicted in FIG. 3 as a dashed line, while the combination of electronic data storage processing functions for the second recordable data corresponding to the second transaction is depicted in FIG. 3 as a solid line.

For the second transaction, a server computer may receive a second data packet comprising the second recordable data associated with the second transaction as well as second address data for the plurality of electronic data storage processing modules run on the one or more computers. The second address data may include the first address that was also included in the first address data for processing the first recordable data for the first transaction conducted by user device 204. This is because in this exemplary case, the first recordable data for the first transaction and the second recordable data for the second transaction may be processed using the same aggregating function A1. The server computer may thus utilize the first address to route the second recordable data to aggregating function A1 of aggregator module 210, which can then process the second recordable data. Additionally, the second address data may also include another address that can utilized to route the second recordable data to formatting function F1 of formatter module 211, which can the process the second recordable data. Formatting function F1 may convert the second recordable data into a second format that is compatible with electronic data storage 230. The second recordable data can additionally be routed to, based on two additional addresses in the second address data, and processed by signing function S3 of operator signer module 212 and validating function V2 of validator module 213. The second recordable data may then be recorded to electronic data storage 230.

Embodiments of the invention are advantageous over conventional systems, which typically include multiple disconnected modules for processing different types of recordable data. In a conventional system, if an entity wants to utilize different electronic data storage to store information related to different types of transactions, the entity typically has to onboard with multiple platforms that provide processing capabilities for the different types of transactions. For example, the entity may have to register with a platform specifically for recording information related to cryptocurrency transactions, as well as with another platform specifically for recording information related to ownership transactions.

In contrast, embodiments of the invention can provide a single platform that enables processing of a plurality of different types of recordable data to be recorded in electronic data storage. For example, a user that can own multiple user devices that may each be utilized to conduct different types of transactions (e.g., identity verification transactions, cryptocurrency transactions, and ownership transactions). As a result, information associated with the different types of transactions may have different types of recordable data be meant to be recorded in different electronic data storage. While conventional systems may require the user to onboard with a different electronic data storage platform for each user device, embodiments of the invention can enable the user to onboard with a single electronic data storage platform capable of processing multiple different types of recordable data. This reduces use of computing resources and processing power typically utilized to register and communicate with multiple electronic data storage platforms.

Figure 6:
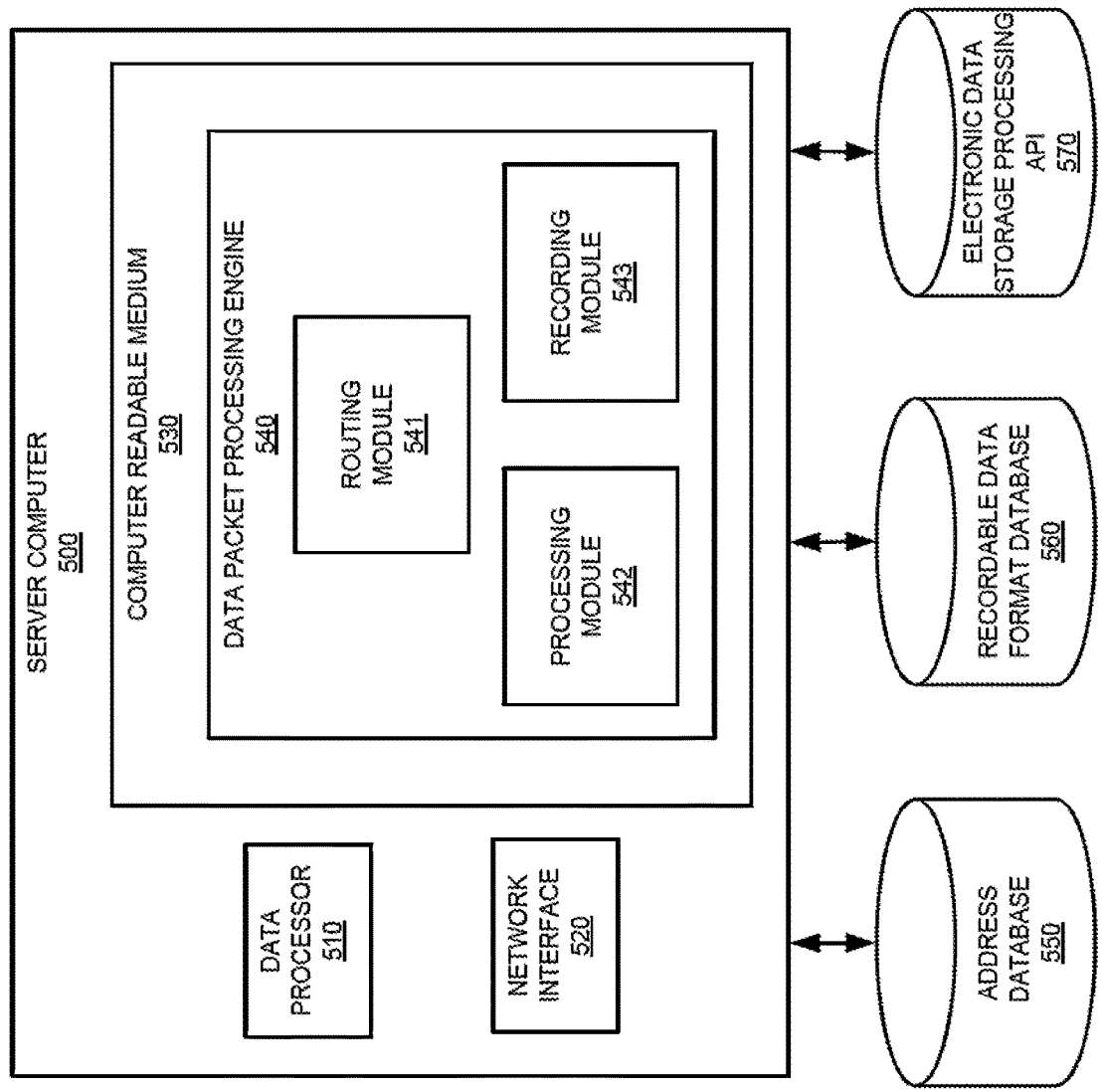
FIG. 6 shows a block diagram showing various elements of a server computer according to embodiments of the present invention.

FIG. 6 shows a block diagram of an exemplary server computer 500 according to embodiments of the invention. FIG. 6 shows a number of components, and server computer 500 according to embodiments of the invention may comprise any suitable combination or subset of such components. Server computer 500 includes a data processor 510 for executing functions, a network interface 520 for communicating with other computing devices, and a computer readable medium 530 for storing data. The computer readable medium 530 may comprise a number of software modules including a data packet processing engine 540, which can comprise a routing module 541, a processing module 542, and a recording module 543.

Other modules and submodules may also reside on computer readable medium 530. Examples of additional modules may data extraction (e.g., for retrieving data from external data sources such as databases) modules, storage modules, and message modification modules. Each module residing on computer readable medium 530 may be combined with any of the additional modules as appropriate. Any of the modules may comprise one or submodules, where each submodule may comprise one or more functions implemented by code, executable by data processor 510.

In some embodiments, server computer 500 may also be in communication with several databases including address database 550, recordable data format database 560, and electronic data storage processing API 570. Each database may be a conventional, fault tolerant, relational, scalable, secure database such as those commercially available from Oracle™ or Sybase™. In some embodiments, any of the databases may be combined into a single database, or may be separated into multiple databases. Server computer 500 may also be in communication with other databases that are not shown in FIG. 6.

Routing module 541 may enable, with data processor 510, recordable data to be routed to appropriate electronic data storage processing modules. Routing module 541 may enable, with data processor 510, determination of the address data included in a data packet as well as determination of a plurality of addresses included in the address data. In some embodiments, routing module 541 may determine, with data processor 510, the plurality of addresses by splitting the address data based on the known length of each address. In some cases, routing module 541 may determine, in conjunction with data processor 510, the sequence in which the plurality of addresses is to be utilized for routing to an electronic data storage processing modules based on the relative order of the addresses in the address data. In other cases, routing module 541 may determine, in conjunction with data processor 510, the sequence in which the plurality of addresses is to be utilized for routing to an electronic data storage processing modules based on sequence identifiers included in the address data. Each address in the address data may be associated with a different sequence identifier, which can indicate a relative order in which the address is to be utilized.

Upon determining an address from the address data, routing module 541 may enable, in conjunction with data processor 510, determination of electronic data storage processing module to which the recordable data should be routed. In some embodiments, routing module 541 may access address database 550 to determine the appropriate electronic data storage processing module. For example, routing module 541 may query, with data processor 510, address database 550 with the determined address. In response to the query, address database 550 may return a function identifier (e.g., function name) in electronic data storage processing module that corresponds to the address. Routing module 541 may send, using data processor 510, the function identifier to processing module 542.

Processing module 542 may enable, with data processor 510, recordable data to be processed by electronic data storage processing modules. Upon receiving a function identifier, processing module 542 may call, in conjunction with data processor 510, the function using information in electronic data storage processing API 570. In some embodiments, processing module 542 may query, with data processor 510, electronic data storage processing API 570 using the function identifier (e.g., function name) received from routing module 541 in order to determine information related to the function. In some cases, the information related to the function may indicate the number of arguments of the function, the type of arguments of the function, the electronic data storage processing function associated with the function, and any other suitable information that can be utilized to call the function.

In some embodiments, processing module 542 may access, with data processor 510, recordable data format database 560 for processing recordable data. For example, this may occur when the function to be called is associated with electronic data storage processing module for formatting recordable data (e.g., formatter module). The function may enable conversion of recordable data into a format compatible with electronic data storage. In some embodiments, processing module 542 may access, with data processor 510, recordable data format database 580 using the function identifier associated with the function. By accessing recordable data format database 560, processing module 452 may determine, with data processor 510, information related to the format of the recordable data from which as well the format of the electronic data storage to which the function is meant to perform the conversion. This information may include the order, lengths, as well as types of data fields in the recordable data and in a data entry of the electronic data storage. Additionally, the information may indicate a mapping between data fields in the recordable data and data fields in the electronic data storage. Processing module 542 may then determine, in conjunction with data processor 510, convert values of data fields from the recordable data to values of corresponding data fields in the electronic data storage according to the information determined from recordable data format database 560.

Recording module 543 may enable, in conjunction with data processor 510, recordable data to be recorded to an electronic data storage. Recording module 543 may generate, with data processor 510, a new data entry including recordable data for the electronic data storage. In some embodiments, recording module 543 may store, using data processor 510, the data entry in the electronic data storage in association with electronic data storage account of a user to indicate that the user conducted the ownership transaction. In this case, recording module 543 may determine, with data processor 510, the public address (e.g., hashed public key) associated with the user of user device 204 and record the data entry in association with the public address.

Address database 550 may include any information related to addresses. Address database 550 may include a plurality of addresses. In addition, address database 550 may store a mapping between a plurality of addresses and a plurality of functions associated with electronic data storage processing modules. The plurality of functions may be indicated by a plurality of unique function identifiers (e.g., function names).

Recordable data format database 560 may include any information related to formatting of recordable data. Recordable data format database 560 may include function identifiers associated with functions that enable conversion of recordable data with certain formats in association with information indicating details about the formats. Recordable data format database 580 may also store, in association with corresponding function identifiers, details about the formats of electronic data storage to which the functions are meant to convert values from recordable data. Details about a format may include information indicating the order, lengths, as well as types of data fields.

Electronic data storage processing API 570 may comprise any information related to conducting processing using electronic data storage processing modules. For example, electronic data storage processing API 570 may include software, code, and data enabling server computer 500 to utilize electronic data storage processing modules to process recordable data. In some embodiments, electronic data storage processing API 570 may store information software, code, and data for implementing a function in association with a function identifier corresponding to the function. In some cases, electronic data storage processing API 570 may also indicate a particular electronic data storage processing module with which a function indicated by its function identifier is associated.

In some embodiments, the server computer may be a processor server computer. The processor server computer may include data processing subsystems, networks, and operations. The processor server computer may route information between various computing devices. In some cases, the processor server computer may be utilized to support and deliver authorization services, as well as clearing and settlement services. In some embodiments, the processor server computer may be associated with a payment processing network (e.g., VisaNet® operated by Visa®), which may include wired or wireless network, including the Internet.

Figure 7:
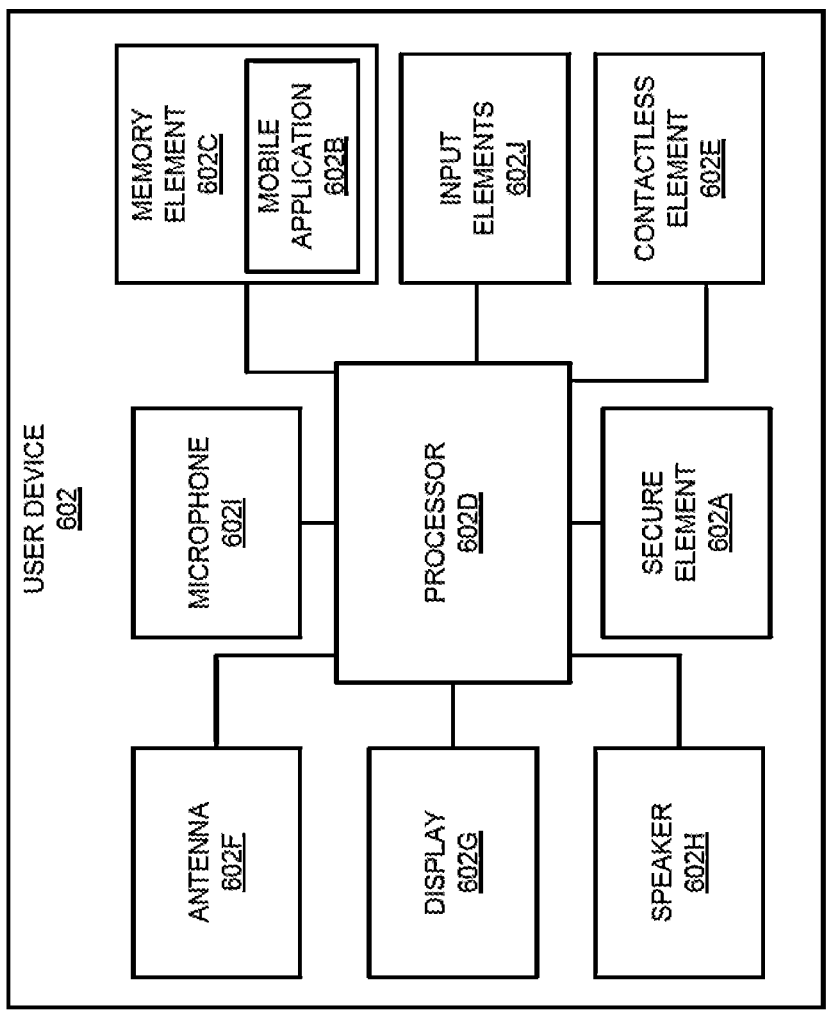
FIG. 7 shows a block diagram showing various elements of a user device according to embodiments of the present invention.

FIG. 7 depicts a block diagram of an exemplary user device 602. FIG. 7 shows a number of components, and user device 602 according to embodiments of the invention may comprise any suitable combination or subset of such components.

User device 602 may include a processor 602D (e.g., a microprocessor) for processing functions of user device 602. One exemplary function enabled by processor 602D includes processing functions of display 602G to allow a user to see information (e.g., interfaces, contact information, messages, etc.). Processor 602D may include hardware within user device 602 that can carry out instructions embodied as code in a computer-readable medium.

An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

User device 602 may comprise a secure element 602A. Secure element 602A may be a secure memory on user device 602 such that the data contained on secure element 602A cannot easily be hacked, cracked, or obtained by an unauthorized entity. Secure element 602A may be utilized by user device 602 to host and store data and applications that may require a high degree of security. Secure element 602A may be provided to user device 602 by a secure element issuer. Secure element 602A may be either embedded in the handset of user device 602 or in a subscriber identity module (SIM) card that may be removable from user device 602. Secure element 602A can also be included in an add-on device such as a micro-Secure Digital (micro-SD) card or other portable storage device.

Secure element 602A may store any suitable sensitive information. For example, secure element 602A may store access data (e.g., account information, token information, etc.) associated with a user. Other information that may be stored in secure element 602A may include user information or user data (e.g., name, date of birth, contact information, etc.). In other embodiments, some, none, or all of the foregoing information may be stored in memory element 602C or may be stored at a remote server computer (e.g., in the cloud).

User device 602 may comprise a memory element 602C (e.g., computer readable medium). Memory element 602C may be present within a body of user device 602 or may be detachable from the body of user device 602. The body of user device 602 may be in the form of a plastic substrate, housing, or other structure. Memory element 602C may store data (e.g., applications, etc.) and may be in any suitable form (e.g., a magnetic stripe, a memory chip, etc.).

Memory element 602C may comprise a mobile application 602B. Mobile application 602B may be computer code or data stored on a computer readable medium (e.g. memory element 602C or secure element 602A) that may be executable by processor 602D to complete a task (e.g., provide a service). Mobile application 602B may be an application that operates on user device 602 and that may provide a user interface for user interaction (e.g., to enter and view information).

In some embodiments, mobile application 602B may be a service provider application. Mobile application 602B may communicate with a service provider computer to retrieve and return information during processing of any of a number of services offered to the user via user device 602 (e.g., providing access to a resource).

User device 602 may further include a contactless element 602E, which may typically be implemented in the form of a semiconductor chip (or other electronic data storage element) with an associated wireless transfer (e.g., data transmission) element, such as an antenna 602F. Contactless element 602E may be associated with (e.g., embedded within) user device 602. Data or control instructions transmitted via a cellular network may be applied to contactless element 602E by means of a contactless element interface (not shown). In some cases, the contactless element interface may function to permit the exchange of data and/or control instructions between the user device circuitry (and hence the cellular network) and an optional contactless element 602E.

Contactless element 602E may be capable of transferring and receiving data using a near-field communications (NFC) capability (or NFC medium) typically in accordance with a standardized protocol or data transfer mechanism (e.g., ISO 14443/NFC). User device 602 may support contactless transactions using the EMV contactless communication protocol (EMV-CCP), which is based on ISO 14443, in order to interact with access devices (e.g., reader devices). This capability may typically be met by implementing NFC. The NFC capability of user device 602 may be enabled by an embedded NFC chip or by the addition of an external memory card or accessory that contains the NFC chip. NFC capability is a short-range communications capability, such as RFID, Bluetooth®, infra-red, or other data transfer capability that can be used to exchange data between the user device 602 and an interrogation device. Thus, user device 602 may be capable of communicating and transferring data and/or control instructions via both cellular network and near-field communications capability.

User device 602 may further include an antenna 602F for wireless data transfer (e.g., data transmission). Antenna 602F may be utilized by user device 602 to send and receive wireless communications. Antenna 602F may assist in connectivity to the Internet or other communications networks and enable data transfer functions. Antenna 602F may enable SMS, USSD, as well as other types of cellular communications, such as voice call and data communications.

User device 602 may include a display 602G that may show information to a user. Display 602G may be any suitable screen that enables touch functionality. In some embodiments, display 602G of user device 602 may display a user interface (e.g., of a mobile application or website) that may allow the user to select and interact with objects presented on display 602G. The objects may include, but may not be limited to, menus, text fields, icons, and keys/inputs on a virtual keyboard.

User device 602 may include a speaker 602H, which may be any suitable device that can produce sound in response to an electrical audio signal. Speaker 602H may play recorded sounds, as well as prerecorded messages to communicate with a user. In some cases, the user may be able to receive instructions by voice communications played by speaker 602H to which the user may respond (e.g., by returning voice command, activating input elements, etc.).

User device 602 may include a microphone 602I, which may be any suitable device that can convert sound to an electrical signal. Microphone 602I may be utilized to capture one or more voice segments from a user. For example, microphone 602I may allow the user to transmit his or her voice to user device 602. In some embodiments, the user may utilize voice commands detected by microphone 602I to provide instructions to user device 602. In some cases, the user may provide voice commands detected by microphone 602I to navigate through mobile application 602B.

User device 602 may further include input elements 602J to allow a user to input information into the device. Example input elements 602J include hardware and software buttons, audio detection devices (e.g., microphone), biometric readers, touch screens, and the like. A user may activate one or more of input elements 602J, which may pass user information to user device 602. In some cases, one or more of input elements 602J may be utilized to navigate through various screens of mobile application 602B.

In some embodiments, where user device 602 is a phone or other similar computing device, user device 602 may include a browser stored in the memory element 602C and may be configured to retrieve, present, and send data across a communications network (e.g., the Internet). In such embodiments, user device 602 may be configured to send data as part of a transaction. In some embodiments, user device 602 may provide the data upon request from another entity (e.g., access device).

A computer system may be utilized to implement any of the entities or components described above. Subsystems of the computer system may be interconnected via a system bus. Additional subsystems may include a printer, a keyboard, a fixed disk (or other memory comprising computer readable media), a monitor, which is coupled to a display adapter, and others. Peripherals and input/output (I/O) devices, which couple to an I/O controller (which can be a processor or other suitable controller), can be connected to the computer system by any number of means known in the art, such as by a serial port. For example, the serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

Specific details regarding some of the above-described aspects are provided above. The specific details of the specific aspects may be combined in any suitable manner without departing from the spirit and scope of embodiments of the technology. For example, back end processing, data analysis, data collection, and other transactions may all be combined in some embodiments of the technology. However, other embodiments of the technology may be directed to specific embodiments relating to each individual aspect, or specific combinations of these individual aspects.

It should be understood that the present technology as described above can be implemented in the form of control logic using computer software (stored in a tangible physical medium) in a modular or integrated manner. While the present invention has been described using a particular combination of hardware and software in the form of control logic and programming code and instructions, it should be recognized that other combinations of hardware and software are also within the scope of the present invention. Based on the disclosure and teachings provided herein, a person of ordinary skill in the art will know and appreciate other ways and/or methods to implement the present technology using hardware and a combination of hardware and software Any of the software components or functions described in this application, may be implemented as software code to be executed by a processor using any suitable computer language such as, for example, Java, C++ or Per using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

In some embodiments, any of the entities described herein may be embodied by a computer that performs any or all of the functions and steps disclosed.

One or more features from any embodiment may be combined with one or more features of any other embodiment without departing from the scope of the technology.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed:

1. A method comprising:
   receiving a data packet comprising a) data and b) address data for a plurality of electronic data processing modules run on one or more computers, the address data comprising a first address for a first electronic data processing module and a second address for a second electronic data processing module;
   routing the data and at least some of the address data to the first electronic data processing module using the first address;
   processing the data by the first electronic data processing module;
   routing the data processed by the first electronic data processing module to the second electronic data processing module using the second address; and
   processing the data by the second electronic data processing module,
   wherein the first electronic data processing module and the second electronic data processing module are different, and are each selected from the group consisting of an aggregator module, a formatter module, an operator signing module, and a validator module.

2. The method of claim 1, wherein the first electronic data processing module comprises the aggregator module and the second electronic data processing module comprises the formatter module.

3. The method of claim 2, wherein processing the data by the first electronic data processing module comprises:
   determining a function from the aggregator module based on the first address; and
   processing the data using the function, wherein the function is configured to aggregate the data.

4. The method of claim 2, wherein processing the data by the second electronic data processing module comprises:
   determining a function from the formatter module based on the second address; and
   processing the data using the function, wherein the function is configured to convert the data into a format compatible with an electronic data storage.

5. The method of claim 4, wherein the data packet is a first data packet, the data is first data, and wherein the method further comprises:
   receiving a second data packet comprising a) second data and b) second address data for the plurality of electronic data processing modules run on the one or more computers, the second address data comprising the first address for the first electronic data processing module and a third address for the second electronic data processing module;
   routing the second data and at least some of the second address data to the first electronic data processing module using the first address;
   processing the second data by the first electronic data processing module;
   routing the second data processed by the second electronic data processing module to the second electronic data processing module using the third address; and
   processing the second data by the second electronic data processing module.

6. The method of claim 5, wherein the function is a first function, wherein the format is a first format, and wherein processing the second data by the second electronic data processing module comprises:
   determining a second function from the formatter module based on the third address; and
   processing the second data using the second function, wherein the second function is configured to convert the second data into a second format.

7. The method of claim 1, wherein the first electronic data processing module comprises the aggregator module and the second electronic data processing module comprises the operator signing module.

8. The method of claim 1, wherein the first electronic data processing module comprises the formatter module and the second electronic data processing module comprises the validator module.

9. The method of claim 1, wherein the first electronic data processing module is the aggregator module which aggregates transactions.

10. The method of claim 9, wherein the second electronic data processing module is the operator signing module which digitally signs the aggregated transactions.

11. A server computer comprising:
    a processor; and
    a computer readable medium coupled to the processor, the computer readable medium comprising code, executable by the processor, to perform a method comprising:
    receiving a data packet comprising a) data and b) address data for a plurality of electronic data processing modules run on one or more computers, the address data comprising a first address for a first electronic data processing module and a second address for a second electronic data processing module;

routing the data and at least some of the address data to the first electronic data processing module using the first address;

processing the data by the first electronic data processing module;

routing the data processed by the first electronic data processing module to the second electronic data processing module using the second address; and processing the data by the second electronic data processing module, wherein the first electronic data processing module and the second electronic data processing module are different, and are each selected from the group consisting of an aggregator module, a formatter module, an operator signing module, and a validator module.

12. The server computer of claim 11, wherein the first electronic data processing module comprises the aggregator module and the second electronic data processing module comprises the formatter module.

13. The server computer of claim 11, wherein the first electronic data processing module comprises the aggregator module and the second electronic data processing module comprises the validator module.

14. The server computer of claim 11, wherein the first electronic data processing module comprises the aggregator module and the second electronic data processing module comprises the formatter module, wherein the aggregator module aggregates transactions.

15. The server computer of claim 11, wherein processing the data by the first electronic data processing module comprises:

determining a function from the aggregator module based on the first address; and processing the data using the function, wherein the function is configured to aggregate the data.

16. The server computer of claim 11, wherein the data includes a date and time of an event, and entities involved in the event.

17. The server computer of claim 11, wherein processing the data by the second electronic data processing module comprises:

determining a function from the formatter module based on the second address; and processing the data using the function, wherein the function is configured to convert the data into a format compatible with an electronic data storage.

18. The server computer of claim 11, wherein the data packet is a first data packet, the data is first data and wherein the method further comprises:

receiving a second data packet comprising a) second data and b) second address data for the plurality of electronic data processing modules run on the one or more computers, the second address data comprising the first address for the first electronic data processing module and a third address for the second electronic data processing module;

routing, the second data and at least some of the second address data to the first electronic data processing module using the first address;

processing the second data by the first electronic data processing module;

routing the second data processed by the second electronic data processing module to the second electronic data processing module using the third address; and processing the second data by the second electronic data processing module.

19. The server computer of claim 15, wherein the first electronic data processing module is the aggregator module which aggregates transactions.

20. The server computer of claim 11, wherein the second electronic data processing module is the operator signing module which digitally signs the aggregated transactions.

* * * * *